United States Patent Office 3,431,234
Patented Mar. 4, 1969

3,431,234
THERMALLY STABLE POLYMERIC PRODUCTS
Marvin M. Fein, Westfield, Joseph Green, Dover, and Eugene L. O'Brien, Rockaway, N.J., assignors to Thiokol Chemical Corporation, Bristol, Pa., a corporation of Delaware
No Drawing. Continuation-in-part of application Ser. No. 344,562, Feb. 13, 1964, and continuation of application Ser. No. 400,547, Sept. 30, 1964. This application Dec. 12, 1966, Ser. No. 601,207
U.S. Cl. 260—46.5
Int. Cl. C08g 31/09
7 Claims

ABSTRACT OF THE DISCLOSURE

Novel polymeric products of a carboranylsilane are prepared by reacting a compound of the formula $$R(CB_{10}H_{10}C)-(CH_2)_a-\underset{X}{\overset{X}{\underset{|}{Si}}}-R'$$

with water to form the polymer which consists of recurring units of the formula

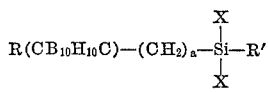

wherein X is alkoxy or halogen, R and R' are hydrogen, aliphatic, aryl or cycloaliphatic radicals and $a$ is an integer including zero. A typical preparation of a polymer within the genus is by reacting methyl-4-(1-carboranyl)-butyldiethyloxysilane with water. Alternatively, methyl (1-methyl - 2 - carboranyl propyl)-dichlorosilane is reacted with water to form a polymer. These polymeric products because of their satisfactory thermal stability are suitable for applications such as potting resins, electrical insulation, etc.

---

This application is a continuation-in-part of application Ser. No. 344,562, filed Feb. 13, 1964, now abandoned, and a continuation of Ser. No. 400,547, filed Sept. 30, 1964, now abandoned.

This invention concerns the preparation of thermally stable silicon and boron containing substances and to a process for preparing them.

More particularly, this invention relates to the preparation of silicon based neocarborane and carborane polymers which have an unusual combination of excellent dielectric properties, thermal stability and good dimensional stability. These novel polymers are useful as high temperature laminating and potting resins, high temperature hydraulic materials, heat transfer materials and the like. The novel polymeric products of this invention are believed to have recurring units included within the structures

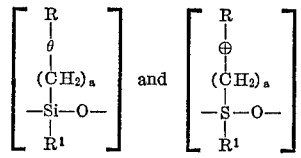

wherein R and R¹ which can be the same or different are selected from the group consisting of hydrogen, aliphatic, aryl and cycloaliphatic radicals and $a$ is an integer including 0.

Carborane is the trivial name used to describe all the dicarbaclovododecaboranes within the empirical formula $B_{10}C_2H_{12}$, as well as the ortho isomer.

Thus, the present polymers may also be defined as consisting essentially of recurring units of the formula:

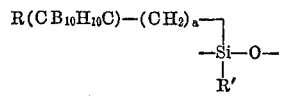

wherein R and R' and $a$ are as defined above.

The radical of the ortho isomer of dicarbaclovododecaborane throughout this application is represented by the Greek letter theta ($\theta$). The structure of this isomer is given below.

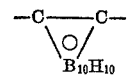

The radical of the meta isomer of dicarbaclovododecaborane throughout this application is represented by the symbol $\oplus$. The trivial name of the meta isomer of carborane is neocarborane.

Within recent years there has been an increasing need in electrical insulation applications for high polymers having an unusual combination of physical properties. These properties include thermal stability above 200° C., general inertness, low water absorption, high temperature dimensional stability and good processability. Materials possessing all of these properties are especially valuable for applications such as electrical potting resins, electrical insulating, laminates for manufacturing electrical circuit boards and dielectric fluids. Epoxy resins and conventional silicone resins while possessing all of the required virtues to some extent, have not been entirely satisfactory insofar as thermal stability and high temperature physical properties are concerned. Because of this, there is a need for resin compositions having the aforementioned physical and electrical characteristics combined with good processability. Resins such as these would be especially desirable for the above-described applications as well as high temperature applications generally. Unfortunately, heretofore, such materials were not available.

Thus, it is an object of this invention among others to prepare a novel class of thermally and dimensionally stable siloxane polymers.

It is another object of this invention to utilize the above novel polymers for electrical potting resins and as varnishes for electrical and laminating applications.

Yet a further object of this invention is to prepare additives and components for silicone, epoxy and other resins.

Further objects of this invention will suggest themselves to those skilled in the art after a further perusal of this patent application.

The above objects and others are achieved by the preparation of a novel group of silicon based carborane and neocarborane containing homopolymers of this invention.

In practice, the novel polymeric products of this invention are prepared by heating a siloxane reactant selected from the group consisting of:

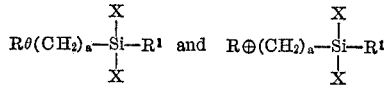

wherein R and R¹ which can be the same or different are selected from the group consisting of hydrogen, aliphatic radicals, aryl radicals and cycloaliphatic radicals, $a$ is an integer including 0, $\theta$ is the ortho carborane radical, $\oplus$ is the meta carborane radical (neocarborane) and X is selected from the group consisting of alkoxy and halogen, in the presence of a reactant containing free hydroxyl groups, preferably water, until polymeric products included within the structure described previously are formed.

The polymeric products of this invention are advantageous insofar as thermal stability, dielectric characteristics and the like are concerned. However, as any large group, some members of the group are preferred to the group as a whole for a variety of reasons. In this invention the preferred polymeric products are the carborane polymers having recurring units included within the formula:

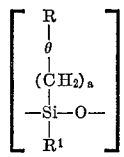

wherein R and $R^1$ are selected from the group consisting of hydrogen and lower alkyl radicals having from 1–4 carbon atoms, and wherein $a$ is an integer ranging from 2 up to and including 4.

The above described carborane products are the preferred embodiments because of the relative ease of preparation of the reactants and that they are obtained in good yields using the inventive process. For example, the carboranes are generally preferred to the comparable neocarborane products in that the neocarborane reactants can only be made from carborane or one of its derivatives. This makes the neocarboranes more costly and tedious to prepare. Similarly compared to the group of carborane polymers having alkenyl groups containing more than 2–4 carbon atoms separating the silicon atom and carborane radical, yields are somewhat better and the precursors are more readily prepared. As indicated earlier, the products having less than 2 methylene groups cannot be prepared by the inventive process and must be prepared indirectly.

The polymeric products of this invention can be prepared using the novel process described supra, over a wide range of reaction conditions. For example, while the reaction is ordinarily complete within 12–120 hours, greater or lesser reaction times depending upon the particular silane-carborane or silane-neocarborane reactant chosen and the molecular weight product desired. Generally longer reaction times produce higher molecular weights while shorter times produce lower molecular weight products. The mode of hydrolysing the reactants and the quantity of hydrolysing agent will also effect the type and the molecular weight of the product produced. For example, there is evidence to suggest that when a silane-carborane or silane-neocarborane having two halogen sites is used as a reactant, the reaction time will be somewhat shortened and the molecular weight within a given reaction time will be increased if less than the stoichiometric amount of water is employed.

In any event, a mixture of primarily cyclic polymeric products having recurring units of the type described earlier are formed in good yield. If desired, the cyclic product can be separated from the linear product using the usual separation techniques such as distillation chromatography and the like. However, these procedures are seldom resorted to since for the contemplated applications, no particular advantage accrues in the use of the separated products. The ratio of hydrolysing reactant, ordinarily water, to the silane reactant is not critical as long as near stoichiometric ratios are present. In fact, in some instances as much as 25% excess of either reactant over the amount required by stoichiometry has not been determined. Lower or higher reaction temperatures can be employed after the initial lower heating stage has been completed. Substantially atmospheric pressures are employed for practicality but higher pressures can be employed if convenient.

The reactants which are the precursors to the polymeric products of this invention can be prepared by several different reactions. In the favored practice, reactants with alkylene groups having 2 or more carbon atoms are prepared by the reaction of a silane hydride reactant with an alkenyl carborane (or alkenyl neocarborane) in the presence of a noble metal catalyst preferably at elevated temperatures.

The favored processes for preparing the reactants where two or more methylene groups separate the carborane (or neocarborane) radical and the double bond are shown below:

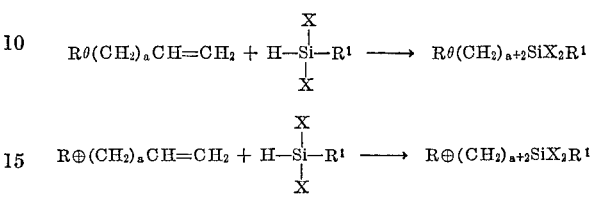

wherein $a$ is an integer from 0 up to and including 8, X is selected from the group consisting of halogen and alkoxy and R and $R^1$ which can be the same or different are selected from the group consisting of hydrogen, aliphatic, cycloaliphatic radicals and aryl radicals, $\theta$ is the symbol for the ortho carborane radical and $\oplus$ is the symbol for the meta neocarborane radical.

The favored silane reactants for the inventive process are those carborane-silanes in which $a$ is an integer ranging from 0 to 2, X is chlorine, and R and $R^1$ are selected from the group consisting of hydrogen and lower alkyl radicals having from 1–4 carbon atoms. The carborane-silanes as indicated earlier are more easily prepared than the neocarborane-silanes and the chlorine derivatives are preferred to the corresponding alkoxy reactants since the reaction rate of the chlorine substituents with water is many times greater than that of the alkoxy.

In the same vein, reactants having hydrogen or lower alkyl substituents on the silicon atom or carborane group are preferred, since the intermediates for making reactants with these substituents are more readily available. Finally, reactants having these substituents are more easily hydrolysed to the desired polymeric products.

The above reactions are conveniently conducted without solvents at temperatures ranging from 20 to 200° C. preferably at temperatures ranging from 30 to 65° C. until substantial quantities of product are formed.

The solution containing either of the monomeric product is separated from the insoluble materials in the reaction mixture using filtration, centrifugation or any other convenient means fo separating liquids and solids. The filtrate is collected and fractionally distilled under a high vacuum to yield a mixture of cyclic (predominately) and linear product. While solvents are not required, the reaction can be conducted in the presence of inert solvents if desired. Typical solvents include the alkanes, aromatics and the like. The order of adding the reactants is not important to the success of the reaction. Similarly the ratios of the two reactants is not critical to the reaction as long as approximately stoichiometric ratios are maintained. However, the reaction can be successfully run when as much as 25% excess of either reactant over the stoichiometric amount are present. The reaction time ordinarily ranges from about 24 hours to about 144 hours or even longer, depending upon the particular reactants used, the reaction temperature and other reaction variables.

The catalyst preferred for maximum yields are the noble metals or sources of the noble metals used with or without inert supporting materials or matrices. Satisfactory nobel metals include osmium, iridium, platinum, palladium, rhodium, ruthenium among others. Platinum or palladium supported on charcoal and the like are the favored catalysts when the free noble metals are utilized, because of lower cost, commercial availability and the good yields that are obtained. Other catalysts such as the free radical catalysts may also be used if desired.

A preferred source of the noble metals are the halonoble metal "acids" such as chloroplatinic acid. When these catalysts are used, no inert support is required since the reagents are liquid in form and can be readily dispersed into the reaction mixture.

As indicated above the preferred method cannot be used to prepare the carboranyl or neocarboranyl reactants containing only one methylene group. To prepare these compounds as well as the other compounds of this invention, a less preferred process can be utilized. This process involves the formation of a Grignard reagent through the reaction of magnesium shavings in ether with an excess of a haloalkylcarborane. The carborane-Grignard is then reacted in excess ether with a trihaloalkyl silane or preferably a trialkoxyalkyl silane.

For example, the reactant: $H\theta CH_2Si(OC_2H_5)_2CH_3$ can be prepared by the above process by reacting 15 parts by weight of the Grignard of bromomethyl carborane $(BrCH_2\theta)$ with a stoichiometric excess of diethoxymethyl silane at ether reflux temperature and distilling off the desired product. A reactant not having any $(CH_2)$ groups such as $CH_3Si(Cl_2)\theta CH_3$ can be prepared among other ways by reacting $C_2H_5MgBr$ with $CH_3\theta H$ to form $H\theta CH_3MgBr$, then reacting the carborane Grignard with the silane $CH_3Si(Cl_2)H$ to form the desired reactant. The corresponding neocarborane: $H\oplus CH_2Si(OC_2H_5)_2CH_3$, can be prepared by the comparable reactions. Carborane (or neocarboranes) with higher alkylene groups can be prepared by this method but yields are relatively poor.

The preferred process embodiment of this invention is to prepare homopolymers by heating the above described silane-carborane monomers or silane-neocarborane monomers with an excess of water at temperatures ranging from 2–200 hours.

An illustrative embodiment is the preparation of a polymeric product from $H\theta(CH_2)_4Si(OC_2H_5)_2C_4H_9$ reactant. This product is prepared by heating 20 parts by weight of the above reactant with excess water to about 70 to 100° C. for 48 hours. The term "excess water" as heretofore employed refers to an excess above the stoichiometric quantity required to hydrolyse the two halo or alkoxy groups in the reactant. At the end of this time the temperature is raised to about 150°–200° C. and the reaction continued for 48 additional hours. The product is a clear resinous material having a softening point above 60° C. and a molecular weight in excess of 1000. The product is thermally stable at elevated temperatures.

Another illustration of the preparation of the product is the preparation of a polymeric product from

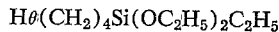

$H\theta(CH_2)_4Si(OC_2H_5)_2C_2H_5$ reactant by heating the above reactant with an excess of water. The reaction mixture is first heated to about 100° C. for about 24 hours then the temperature is raised to about 140° C. and the heating is continued for about an additional 72 hours. A resinous product is obtained having a softening point above 50° C., and a molecular weight in excess of 1000. The product is thermally stable at elevated temperatures.

A further illustrative embodiment is the preparation of a polymeric product from $H\theta(CH_2)_5Si(OCH_3)_2$-n-$C_3H_7$ carborane by heating a reaction mixture consisting of the above reactant and an excess of water to about 90° C. After 12 hours the temperature is slowly raised to about 150° C. as the water is stripped and the heating is continued for an additional 96 hours. A resinous material is obtained having a softening point above 35° C. and a molecular weight in excess of 1000. The product is thermally stable at elevated temperatures.

An additional illustrative embodiment is the preparation of a polymeric product from $H\theta(CH_2)_4Si(Br_2)CH_3$ reactant by heating a reaction mixture of the above reactant with an excess of water. The reaction mixture is first heated to about 80° C. for about 24 hours, then heated for an additional 72 hours at 150° C. at the end of this time a resinous product is obtained having a softening point above 60° C. and a molecular weight in excess of 1000. The product is thermally stable at elevated temperatures.

Yet another embodiment is the preparation of a polymeric product from $H\theta(CH_2)_4Si(Cl_2)C_2H_5$ reactant. This preparation is accomplished by heating a reaction mixture of the above reactant with an excess of water to about 80° C. Then heating at a higher temperature (120° C.) is continued for an additional 36 hours, then the reaction is halted. A resinous product is obtained having a softening point above 50° C. and a molecular weight in excess of 1000 is obtained. The material again is thermally stable.

Still another preferred embodiment is the preparation of a polymeric product from $H\theta(CH_2)_6Si(Cl_2)CH_3$ reactant as follows. First a reaction mixture of the above reactant is heated with excess water to about 100° C. for about 48 hours. After this time, the reaction temperature is raised to about 150° C. (as the water is stripped) and the heating continued for an additional 72 hours. A thermally stable resinous product having a softening point above 20° and a molecular weight in excess of 1000 is produced.

Another version of the preferred embodiment is the preparation of a polymeric product from the reactant $H\theta(CH_2)_3Si(Cl_2)CH_3$. This product is prepared by heating to 80° C. a reaction mixture consisting of the above reactant and excess water for 36 hours, then raising the temperature to about 150° C. and continuing the heating for an additional 72 hours. At the end of this time a resinous product having a softening point above 60° C. and a molecular weight in excess of 1000 is obtained. The resin product is thermally stable at elevated temperatures.

Still another version of the preferred embodiment is the preparation of a polymeric product from the reactant $H\theta(CH_2)_6Si(OCH_3)_2$-n-$C_3H_7$. This product is prepared by heating a reaction mixture consisting of the above reactant and an excess of water to about 80° C. for about 24 hours, then raising the temperature to 150° C. and continuing the heating for an additional 72 hours. The resin so produced has a softening point above 20° C. and a molecular weight in excess of 1000. The resin is thermally stable at elevated temperatures.

Yet another version of the preferred embodiment is the preparation of a polymeric product from the reactant $H\theta(CH_2)_4Si(Cl_2)C_6H_{13}$. This product is prepared by heating a reaction mixture of the above reactant and an excess of water to about 75° C. for about 48 hours. The temperature of the reaction mixture is then raised to about 150° C. and the heating continued for an additional 12 hours. A resinous material is obtained. It has a softening point above 0° C. and a molecular weight in excess of 1000. The material is thermally stable at elevated temperatures.

Other embodiments are as follows:
A polymeric product is prepared from

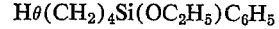

$H\theta(CH_2)_4Si(OC_2H_5)C_6H_5$ by heating 30 parts by weight of the above phenyl reactant and excess water to a temperature of about 75° C. The heating at this temperature is continued for about 10 hours and then the temperature is raised to 130° C. and the heating continued for an additional 90 hours. A resinous product is prepared having a softening point above 80° C. and a molecular weight in excess of 1000. The material is thermally stable at elevated temperatures.

A polymeric product from the reactant

$H\theta(CH_2)_6Si(OCH_3)_2$-p-Cl—$C_6H_4$ is prepared as follows:
A reaction mixture of the above reactant and excess water is slowly heated to about 80° C., then the temperature is raised to about 150° C. The heating at the more elevated temperature is continued for an additional 72 hours. A resinous product is obtained which has a softening point above 100° C. and a molecular weight in excess of 1000. The resin is thermally stable at elevated temperatures.

Yet another embodiment of this invention is the preparation of a polymeric product from the reactant $$CH_3SiCl_2(CH_2)_3\theta CH_3$$

This preparation is accomplished by heating a reaction mixture of the above carborane reactant and an excess of water to about 90° C. Then heating at a higher temperature (120° C.) is continued for an additional 36 hours, then the reaction is halted. A resinous product is obtained having a softening point about 50° C. and a molecular weight in excess of 1000 is obtained. The material again is thermally stable.

Still another preferred embodiment is the preparation of a polymeric product from the silane-carborane reactant, $C_6H_5Si(C_2H_5O)_2(CH_2)_3\theta CH_3$ as follows. First, a reaction mixture of the above reactant is heated with excess water to about 100° C. for about 48 hours. After this time, the reaction temperature is raised to about 150° C. (as the water is stripped) and the heating continued for an additional 72 hours. A thermally stable resinous product having a softening point above 50° C. and a molecular weight in excess of 100 is produced.

Another version of the preferred embodiment is the preparation of a polymeric product from the reactant p-$CH_3$—$C_6H_4SiCl_2(CH_2)_3\theta CH_3$. This product is prepared by heating a reaction mixture consisting of the above reactant and excess water to 80° C. for 36 hours, then raising the temperature to about 150° C. and continuing the heating for an additional 96 hours. At the end of this time a resinous product having a softening point above 60° C. and a molecular weight in excess of 1000 is obtained. The resin is thermally stable at elevated temperatures.

Still another version of the preferred embodiment is the preparation of a polymeric product from the reactant, $CH_3SiCl_2(CH_2)_2\theta CH_3$. This product is prepared by heating a reaction mixture consisting of the above reactant and excess water to about 80° C. for about 36 hours, then raising the temperature to 150° C. and continuing the heating for an additional 80 hours. The resin so produced has a softening point above 20° C. and a molecular weight in excess of 1000. The resin produced is thermally stable.

Yet another embodiment of the inventive concept is the preparation of a polymeric product from the reactant, $CH_3SiCl_2(CH_2)_4\theta C_2H_5$. This preparation is accomplished by heating a reaction mixture of the above reactant and excess water to about 80° C. Then heating at a higher temperature (120° C.) is continued for an additional 36 hours, then the reaction is halted. A resinous product is obtained having a softening point above 50° C. and a molecular weight in excess of 1000 is obtained. The material again is thermally stable.

Still another embodiment is the preparation of a polymeric product from the reactant, $$CH_3SiCl_2(CH_2)_3\theta\text{-n-}C_4H_9$$

as follows. First a reaction mixture of the above reactant is heated with 30 parts by weight of water to about 100° C. for about 60 hours. After this time, the reaction temperature is raised to about 150° C. (as the water is stripped) and the heating continued for an additional 72 hours. A thermally stable resinous product having a softening point above 20° C. and a molecular weight in excess of 1000 is produced.

Another embodiment is the preparation of a polymeric product from the reactant, $CH_3SiCl_2(CH_2)_3\theta C_6H_5$ (phenyl). This product is prepared by heating to 80° C. a reaction mixture consisting of the above reactant, and excess water for 42 hours, then raising the temperature to about 150° C. and continuing the heating for an additional 72 hours. At the end of this time a resinous product having a softening point above 60° C. and a molecular weight in excess of 1000 is obtained. The resin is thermally stable.

Still another embodiment is the preparation of a polymeric product from the carborane reactant, $$CH_3Si(OC_2H_5)_2(CH_2)_3\theta CH_3$$

This product is prepared by heating a reaction mixture consisting of the above carborane reactant and excess water to about 80° C. for about 24 hours, then raising the temperature to 150° C. and continuing the heating for an additional 72 hours. The resin so produced has a softening point about 50° C. and a molecular weight in excess of 1000. The resin is thermally stable at elevated temperatures.

Another group of related embodiments are the preparation of the neocarboranes (⊕) corresponding to the above described silane-carborane polymeric products.

An illustration of these embodiments is the preparation of a polymeric product from the neocarborane reactant, $H\oplus(CH_2)_4Si(OC_2H_5)_2C_4H_9$. This neocarborane product is prepared by heating the above neocarborane reactant with excess water to about 70 to 100° C. for 48 hours. At the end of this time the temperature is raised to about 150° C. and the reaction continued for 48 additional hours. The product is a clear resinous material having a softening point above 60° C. and a molecular weight in excess of 1000. The product is thermally stable at elevated temperatures.

Another illustration of the preparation of the corresponding neocarborane polymeric product is the preparation of a polymeric neocarborane product from the reactant $H\oplus(CH_2)_4Si(OC_2H_5)_2C_2H_5$, by heating the neocarborane reactant with excess water. The reaction mixture is first heated to about 100° C. for about 24 hours then the temperature is raised to about 140° C. and the heating is continued for about an additional 72 hours. A resinous product is obtained having a softening point above 50° C., and a molecular weight in excess of 1000. Again the product is thermally stable.

A further illustration of the preparation of neocarborane polymeric products is the preparation of a product from the reactant $H\oplus(CH_2)_5Si(OCH_3)_2\text{-n-}C_3H_7$, by heating a reaction mixture consisting of the above neocarborane reactant and excess water to about 90° C. After 12 hours, the temperature is slowly raised to about 150° C. as the water is stripped and the heating is continued for an additional 96 hours. A resinous material is obtained having a softening point above 35° C. and a molecular weight in excess of 1000. The product is thermally stable at elevated temperatures.

An additional embodiment of this invention is the preparation of the polymeric product from $$H\oplus(CH_2)_4Si(Cl_2)CH_3$$

This neocarborane polymeric product is made by heating a reaction mixture of the above reactant compound with excess water. The reaction mixture is first heated to about 80° C. for about 24 hours, then heated for an additional 72 hours at 150° C. At the end of this time a resinous product is obtained having a softening point above 60° C. and a molecular weight in excess of 1000. The product is thermally stable at high temperatures.

Yet another preparation of a neocarborane polymeric product is the preparation from the reactant $$H\oplus(CH_2)_4Si(Cl_2)C_2H_5$$

This product is made by heating a reaction mixture of the above reactant and excess water to about 80° C. Then heating at a higher temperature (120° C.) is continued for an additional 36 hours and then the reaction is halted. A resinous product is obtained having a softening point above 50° C. and a molecular weight in excess of 1000 is obtained. The material again is thermally stable.

Still another embodiment is the preparation of a polymeric product from $H\oplus(CH_2)_6Si(Cl_2)CH_3$ neocarborane reactant as follows. First, a reaction mixture of 80 parts by weight of the above reactant is heated with excess water to about 100° C. for about 48 hours. After this time, the reaction temperature is raised to about 150° C. (as the water is stripped off) and the heating continued for an additional 72 hours. A thermally stable resinous product having a softening point above 20° C. and a molecular weight in excess of 1000 is obtained.

Another version of the preparation of a neocarborane polymeric product is the preparation from $$H \oplus (CH_2)_2Si(Cl_2)CH_3$$

reactant. This product is prepared by heating a reaction mixture consisting of the above neocarborane reactant and excess water at 80° C. for 36 hours, then raising the temperature to about 150° C. and continuing the heating for an additional 72 hours. At the end of this time a resinous product having a softening point above 60° C. and a molecular weight in excess of 1000 is obtained. The resin is thermally stable at elevated temperatures.

Still another embodiment of the neocarborane polymers is the preparation from $H \oplus CH_2Si(Cl_2)C_6H_5$ reactant. This product is prepared by heating a reaction mixture consisting of the above reactant and excess water to about 80° C. for about 24 hours, then raising the temperature to 150° C. and continuing the heating for an additional 72 hours. The resin so produced has a softening point above 20° C. and a molecular weight in excess of 1000.

Yet another embodiment of the neocarborane products is the preparation of polymeric product from $$H \oplus Si(Cl_2)C_6H_5$$

reactant. This product is prepared by heating a reaction mixture of the above neocarborane reactant and excess water to about 75° for about 48 hours. The temperature of the reaction mixture is then raised to about 150° C. and the heating continued an additional 12 hours. A resinous material is obtained. It has a softening ponit above 10° C. and a relatively high molecular weight. The material is thermally stable.

Other embodiments are as follows:

A polymeric product from $H \oplus (CH_2)_4Si(OCH_3)_2C_6H_5$ is prepared by heating the above neocarborane reactant with excess water to a temperature of about 75° C. The heating at this temperature is continued for about 10 hours and then the temperature is raised to 130° C. and the heating continued for an additional 120 hours. A resinous product is prepared having a softening point above 50° C. and a molecular weight in excess of 1000. The material is thermally stable at elevated temperatures.

A polymeric product from $$H \oplus (CH_2)_6Si(OCH_3)_2\text{-}p\text{-}Cl\text{---}C_6H_4$$

neocarborane reactant is prepared as follows.

A reaction mixture of the above neocarborane reactant and excess water is slowly heated to about 80°C., then the temperature is raised to about 150° C. The heating at the more elevated temperature is continued for an additional 96 hours. A resinous product is obtained which has a softening point above 50° C. and a molecular weight in excess of 1000. The resin is thermally stable at elevated temperatures.

Yet another preparation of a neocarborane polymer is the product prepared from $CH_3SiCl_2(CH_2)_3 \oplus CH_3$ reactant. This preparation is accomplished by heating a reaction mixture of above reactant and excess water to about 80° C. Then heating at a higher temperature (120° C.) is continued for an additional 36 hours, then the reaction is halted. A resinous product is obtained having a high softening point and a molecular weight in excess of 1000. The material is thermally stable.

Still another embodiment is the preparation of a polymeric product from $C_6H_5SiCl_2(CH_2)_3 \oplus C_2H_5$ as follows. First a reaction mixture of the above neocarborane reactant is heated with excess water to about 100° C. for about 48 hours. At the end of this time, the reaction temperature is raised to about 150° C. (as the water is stripped off) and the heating continued for an additional 72 hours. A thermally stable resinous product having a softening point above 20° C. and a molecular weight in excess of 1000 is produced.

A further embodiment is the preparation of a polymeric product from p-$CH_3$—$C_6H_4SiCl_2(CH_2)_3 \oplus CH_3$ reactant. This product is prepared by heating a reaction mixture consisting of the above neocarborane reactant and excess water (10 parts by weight) to 80° C. for 36 hours, then raising the temperature to about 150° C. and continuing the heating for an additional 72 hours. At the end of this time a resinous product having a softening point above 50° C. and a molecular weight in excess of 1000 is obtained. The resin is thermally stable at elevated temperatures.

Still a further embodiment is the preparation of polymeric product from $CH_3SiCl_2(CH_2)_2 \oplus CH_3$. This product is prepared by heating a reaction mixture consisting of the above neocarborane and excess water to about 80° C. for about 24 hours, then raising the temperature to 150° C. and continuing the heating for an additional 72 hours. The resin so produced has a softening point above 20° C. and a molecular weight in excess of 1000. Again the resin is thermally stable.

Other embodiments are as follows. The preparation of polymeric product from $CH_3Si(C_2H_5O)_2 \oplus CH_3$ reactant. This preparation is accomplished by heating a reaction mixture of the above-described neocarborane reactant and excess water to about 80° C. Then heating at a higher temperature (120° C.) is continued for an additional 36 hours, then the reaction is halted. A resinous product is obtained having a softening point above 50° C. and a molecular weight in excess of 1000. The material again is thermally stable.

Still another embodiment is the preparation of a polymeric product from $CH_3SiCl_2(CH_2)_4 \oplus C_2H_5$ as follows. First a reaction mixture of the above neocarborane reactant is heated with excess water to about 100° C. for about 48 hours. After this time, the reaction temperature is raised to about 150° C. (as the water is stripped) and the heating continued for an additional 72 hours. A thermally stable resinous product having a softening point above 20° C. and a molecular weight in excess of 1000 is obtained.

Another embodiment is the preparation of a product from $CH_3SiCl_2(CH_2)_3 \oplus C_4H_9$. This product is prepared by heating a reaction mixture consisting of the above neocarborane and excess water to 80° C. for 36 hours, then raising the temperature to about 150° C. and continuing the heating for an additional 72 hours. At the end of this time a resinous product having a softening point above 60° C. and a molecular weight in excess of 1000 is obtained. The resin has good thermal stability.

Still another embodiment is the preparation of resin product from $CH_3SiCl_2(CH_2)_3 \oplus C_6H_5$ reactant. This product is prepared by heating a reaction mixture consisting of the above neocarborane reactant and excess water to about 80° C. for about 24 hours, then raising the temperature to 150° C. and continuing the heating for an additional 72 hours. The resin so produced has a softening point above 30° C. and a molecular weight in excess of 1000. The resin is thermally stable at elevated temperatures.

The advantages of the resin products having been discussed previously it remains only to describe some representative embodiments of this invention in the greatest detail possible. This is shown in the examples which follow.

EXAMPLE 1

Preparation of methyl - 4 - (1 - carboranyl) butyldiethoxysilane reactant and resin product derived from this reactant

A. PREPARATION OF 1-(3-BUTENYL) CARBORANE

A Grignard reagent is prepared by placing 25 parts by weight of fresh magnesium turnings and 235 parts by weight of 1-bromomethylcarborane into 2500 ml. of anhydrous ethyl ether. The material reacts rapidly with the evolutions of some heat.

The reaction mix is cooled to 19° C. and 118 parts by weight of allyl bromide, which had been dissolved in 800 ml. of ethyl ether are added dropwise to the reaction mix while the temperature is maintained at about 20° C. When the addition of the allyl bromide is completed, the mixture is heated to the boiling point and kept at reflux for seven hours. On cooling, a saturated aqueous solution of ammonium chloride is used to hydrolyze the mixture. The ether layer is removed in a separatory funnel, and the product is separated from the ether by distillation.

The boiling point of the product at an absolute pressure of 0.2 mm. of mercury is 99°–101° C. The melting point is 33°–34° C. The yield obtained is the product confirmed to be 1-(3-butenyl) carborane, or alternatively referred to as 4-(1-carboranyl) 1-butene.

Calculated for $C_6H_{18}B_{10}$: C, 36.34; H, 9.14; B, 54.54. Found: C, 34.71; H, 9.43; B, 54.31.

B. PREPARATION OF THE REACTANT

In an appropriate reaction kettle equipped with heating and cooling means as well as a stirrer are added as follows: 50 parts by weight of 1-(3-butenyl) carborane prepared above in Part A, 25 parts by weight of commercially obtained methyldiethoxysilane and 0.5 parts by weight of 5% platinum on charcoal. From the filtered solution 41.3 parts by weight of product boiling at 180° C., 0.5–1 mm. is obtained. Infra-red and elemental analysis agreed with the formula of:

$$H\theta(CH_2)_4Si(OC_2H_5)_2CH_3$$

C. PREPARATION OF RESIN PRODUCT FROM REACTANT

In an appropriately sized reaction vessel equipped with heating, stirring and distillation means is added 18.5 parts by weight of 1-(4-methyldiethoxysilylbutyl) carborane prepared as in Example 1B and a stoichiometric quantity of water. The initial heating step is to 80° C. for two hours. At the end of this time the reaction temperature is raised to 175° C. and the heating continued at this more elevated temperature for an additional 72 hours. The resinous product is a transparent clear glass having a softening point of 70° C. and a molecular weight of about 2500. The product is cast in a mold and withstands heating at televated temperatures (above 200° C.) without noticeable discoloration or degradation.

EXAMPLE 2

Preparation of methyl(1-methyl-2-carboranylpropyl)dichlorosilane reactant and resin product derived from this reactant

A. PREPARATION OF METHYLALLYLCARBORANE (1-METHYL-2(1-PENTENYL)CARBORANE

A Grignard reagent is prepared by placing 11 parts by weight of fresh magnesium turnings and 110 parts by weight of bromomethylcarborane into 180 ml. of anhydrous tetrahydrofuran (THF). The material reacts rapidly with the evolutions of some heat.

The reaction mix is cooled to room temperature and 60.5 parts by weight of allyl bromide, which had been dissolved to 150 ml. of tetrahydrofuran are added dropwise to the reaction mix while the pot temperature is maintained at about 70° C. When the addition of the allyl bromide is completed, heating is continued at reflux for an additional twenty hours. On cooling, a saturated aqueous solution of ammonium chloride is used to hydrolyze the mixture. The THF layer is removed in a separatory funnel, and the product is separated from the THF by distillation.

The boiling point of the product at an absolute pressure of 0.2 mm. of mercury is 74°–77° C. The refractive index at 25° C. is 1.5482. Analysis confirmed the intermediate to be the desired material.

B. PREPARATION OF REACTANT

In an appropriate reaction kettle equipped with heating and cooling means as well as a stirrer are added as follows: 11.21 parts by weight of methylallylcarborane prepared above in Part A, 3 ml. of a solution of one drop of $H_2PtCl_6 \cdot H_2O$ in isopropyl alcohol and 8.50 parts by weight of commercially obtained methyldichlorosilane. After the addition, the temperature is maintained at 50° C. for 2 hours. Fractional distillation produces a colorless liquid product boiling point 120–124° C./.02 mm. Hg. Identity of the product is confirmed by infra-red analysis.

C. PREPARATION OF POLYMERIC PRODUCT FROM REACTANT

A 31 parts by weight portion of the above carborane reactant is placed in an appropriately sized reaction vessel and 18 parts by weight of water is added dropwise with stirring. After the addition is complete, the mixture is heated at 85° C. for 3 hours, then to 175° C. for an additional 75 hours. During the heating at 175° C., the excess water is stripped off giving rise to a resinous product having a softening point of above 70° C. and a molecular weight of about 2700. The product is cast in a mold and withstands heating to above 200° C. without noticeable discoloration or degradation.

EXAMPLE 3

Preparation of methyl(1-methyl-2-carboranylpropyl)diethoxysilane reactant and resin product derived from this reactant

A. PREPARATION OF REACTANT

A 15.75 parts by weight portion of the product of Example 2B is heated to 80° C. with stirring in a reaction vessel fitted with heating, cooling and stirring means on a Dean-Stark receiver. A 17.0 parts by weight portion of ethylorthoformate is added dropwise. After the addition is complete the temperature is raised to 125° C. and the heating is continued for 3 hours. The liquid by-products of the reaction, ethanol and ethyl chloride are collected in the Dean-Stark receiver. The product is fractionated off at 144° C./0.08 mm. Hg and is identified by infrared analysis.

B. PREPARATION OF POLYMERIC PRODUCT FROM REACTANT

A 15 parts by weight portion of the above diethoxy monomer prepared in (A) is heated with excess water under the same conditions described in Example 2. After the heating is complete, the resins physical properties are comparable to the homopolymer of Example 2.

It should be clearly understood that numerous modifications and changes in the inventive process can be made in this invention without departing from the inventive concept. The illustrated embodiments and examples are illustrative only of the flexability of the inventive concept and do not constitute its metes and bounds.

We claim:

1. A resinous polymeric product consisting essentially of recurring units of the formula:

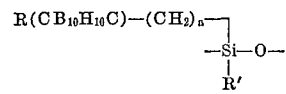

wherein R and R' are selected from the group consisting of hydrogen, aliphatic, aryl and cycloaliphatic radicals and $a$ is an integer including zero.

2. A polymeric product according to claim 1 and wherein said recurring units are of the formula:

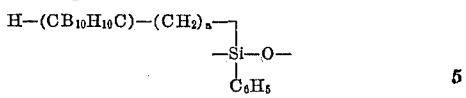

3. A resinous polymeric product consisting essentially of recurring units of the formula:

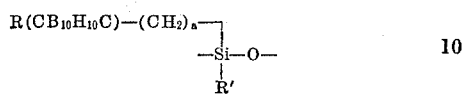

wherein R and R' are selected from the group consisting of hydrogen and lower alkyl radicals of 1 to 4 carbon atoms and $a$ is 2 to 4 inclusive.

4. A polymeric product according to claim 3 and wherein said recurring units are of the formula:

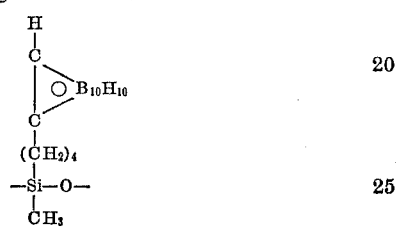

5. A polymeric product according to claim 3 and wherein said recurring units are of the formula:

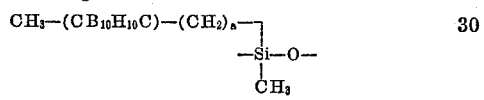

6. A polymeric product according to claim 3 and wherein said recurring units are of the formula:

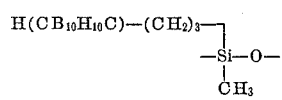

7. A polymeric product according to claim 3 and wherein said recurring units are of the formula:

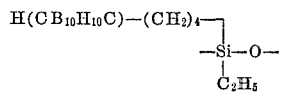

References Cited

UNITED STATES PATENTS 3,321,505   5/1967   Fein et al. _____ 260—606.5
3,354,193   11/1967  Fein et al. _____ 260—46.5

OTHER REFERENCES

Papetti et al., Inorganic Chemistry, Vol. 3, No. 10, October 1964, p. 1448–50.

Chemical and Engineering News, Dec. 9, 1963, p. 62–70.

DONALD E. CZAJA, *Primary Examiner.*

M. T. MARQUIS, *Assistant Examiner.*

U.S. Cl. X.R.

260—606.5; 252—63.7